(12) United States Patent
Shi

(10) Patent No.: US 9,230,359 B2
(45) Date of Patent: Jan. 5, 2016

(54) METHOD FOR RESIZING AN IMAGE

(71) Applicants: Boogoo Intellectual Property LLC, Burlingame, CA (US); Jiazheng Shi, San Jose, CA (US)

(72) Inventor: Jiazheng Shi, San Jose, CA (US)

( * ) Notice: Subject to any disclaimer, the term of this patent is extended or adjusted under 35 U.S.C. 154(b) by 77 days.

(21) Appl. No.: 14/096,037

(22) Filed: Dec. 4, 2013

(65) Prior Publication Data

US 2015/0154792 A1    Jun. 4, 2015

(51) Int. Cl.
| | | |
|---|---|---|
| *G06T 15/00* | (2011.01) | |
| *G06T 15/10* | (2011.01) | |
| *G06T 15/80* | (2011.01) | |
| *G06K 9/46* | (2006.01) | |
| *G06T 3/40* | (2006.01) | |

(52) U.S. Cl.
CPC .............. *G06T 15/10* (2013.01); *G06K 9/4604* (2013.01); *G06T 3/403* (2013.01); *G06T 15/80* (2013.01)

(58) Field of Classification Search
CPC ....... G06T 3/0018; G06T 15/10; G06T 15/80; G06T 3/403; G06K 9/4604
USPC .................... 345/419, 427; 382/276, 284, 298
See application file for complete search history.

(56) References Cited

U.S. PATENT DOCUMENTS

| | | | | |
|---|---|---|---|---|
| 7,058,237 | B2 * | 6/2006 | Liu et al. | 382/276 |
| 7,099,521 | B2 * | 8/2006 | Liu et al. | 382/276 |
| 7,113,650 | B2 * | 9/2006 | Liu et al. | 382/276 |
| 7,149,367 | B2 * | 12/2006 | Cutler | 382/284 |
| 7,184,609 | B2 * | 2/2007 | Liu et al. | 382/276 |
| 7,327,899 | B2 * | 2/2008 | Liu et al. | 382/276 |
| 8,224,122 | B2 * | 7/2012 | Cohen et al. | 382/298 |

OTHER PUBLICATIONS

Bourke Paul, Image Warping for Projection onto a cylinder, StereoGraphics-Cylinder, Dec. 2004, pp. 1-10.*
Levoy Marc, Cylindrical Panoramas, 2010, pp. 1-2.*

* cited by examiner

*Primary Examiner* — Phu K Nguyen
(74) *Attorney, Agent, or Firm* — Jigang Jin

(57) ABSTRACT

A method for resizing an image is disclosed. In a preferred embodiment, the method projects the image onto a lateral surface of a three-dimensional cylinder to transform the image into a three-dimensional image. Then, the method applies perspective projection (with a chosen viewpoint) to transform the three-dimensional image back to a two-dimensional image, based on which a final resized image is generated. By carefully choosing the diameter of the three-dimensional cylinder and the coordinate of the viewpoint, a rectangular shaped image may be resized into a square-shaped image.

20 Claims, 6 Drawing Sheets original image (600x400 pixels)

resized image (291x400 pixels)

original image (800x600 pixels)

resized image (593x600 pixels)

METHOD FOR RESIZING AN IMAGE

FIELD OF INVENTION

This invention relates to image processing in general and more particularly to image resizing.

BACKGROUND OF THE INVENTION

A digital image is a representation of a two-dimensional (2D) numerical data on a regular grid. In general, a digital image has a rectangular or square shape and comprises a plurality of pixels. Each pixel can be represented by a color p, which represent data value, and a coordinate (x, y), which represents grid. Image can be stored in various formats (e.g., JPEG, PNG, BMP) and displayed on different applications. For example, JPEG image is preferred to display images on website. PNG image is preferred for multiple image blending due to its transparency options. BMP image which contains raw 2D raster data is appropriate for computer processing.

Digital images often need to be resized for display devices with different aspect ratios or different resolutions. Currently, there are several techniques widely used for resizing images. These techniques include, for example, scaling, cropping, and seam carving. Resizing images using scaling is often not sufficient since it will result in the distortions of the input image if it is scaled not proportionally (i.e., the aspect ratio of the image is changed). Cropping is also of limited use since it will discard certain information of the input image. Seam carving techniques alter the dimensions of an image by removing pixels from the image or adding pixels to the image that are considered to be less important than other pixels of the image (e.g., based on a pixel's value as compared to the value of its neighbors). However, seam carving techniques may be computationally expensive and may also produce undesirable artifacts or distortions.

Therefore, a method for resizing an image without unnatural distortion or content loss is needed.

SUMMARY OF THE INVENTION

In one embodiment of the present invention, a method for reducing the size of an image without any content loss is disclosed. The claimed invention transforms the image from the two-dimensional (2D) space to the three-dimensional (3D) space and then back to the 2D space to reduce the size and change the aspect ratio of the image. The transformation takes advantage of what is acceptable to regular human visual perceptions so that any distortion of the image as a result of the transformation would be visually or aesthetically acceptable to viewers. Particularly, the image is projected onto a nonplanar surface of a 3D shape, preferably a cylinder. The projection transforms the input image into a 3D image, which is further transformed into a 2D image via perspective projection. As a result, the final 2D image appears to be a 3D representation of the original image. Meanwhile, the size and aspect ratio of the image are changed.

In another embodiment of the present invention, certain light effects (such as shading or reflection) are applied to a transformed image to further enhance the 3D visual effect as a result of such transformation. Accordingly, undesired features of the image (e.g., distorted edges) may be removed while maintaining the intended visual effect. This approach would allow further reduction of the size of the image.

Yet in another embodiment of the present invention, by carefully selecting the 3D surface and its dimensions, a rectangle-shaped image may be transformed into a square-shaped image.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
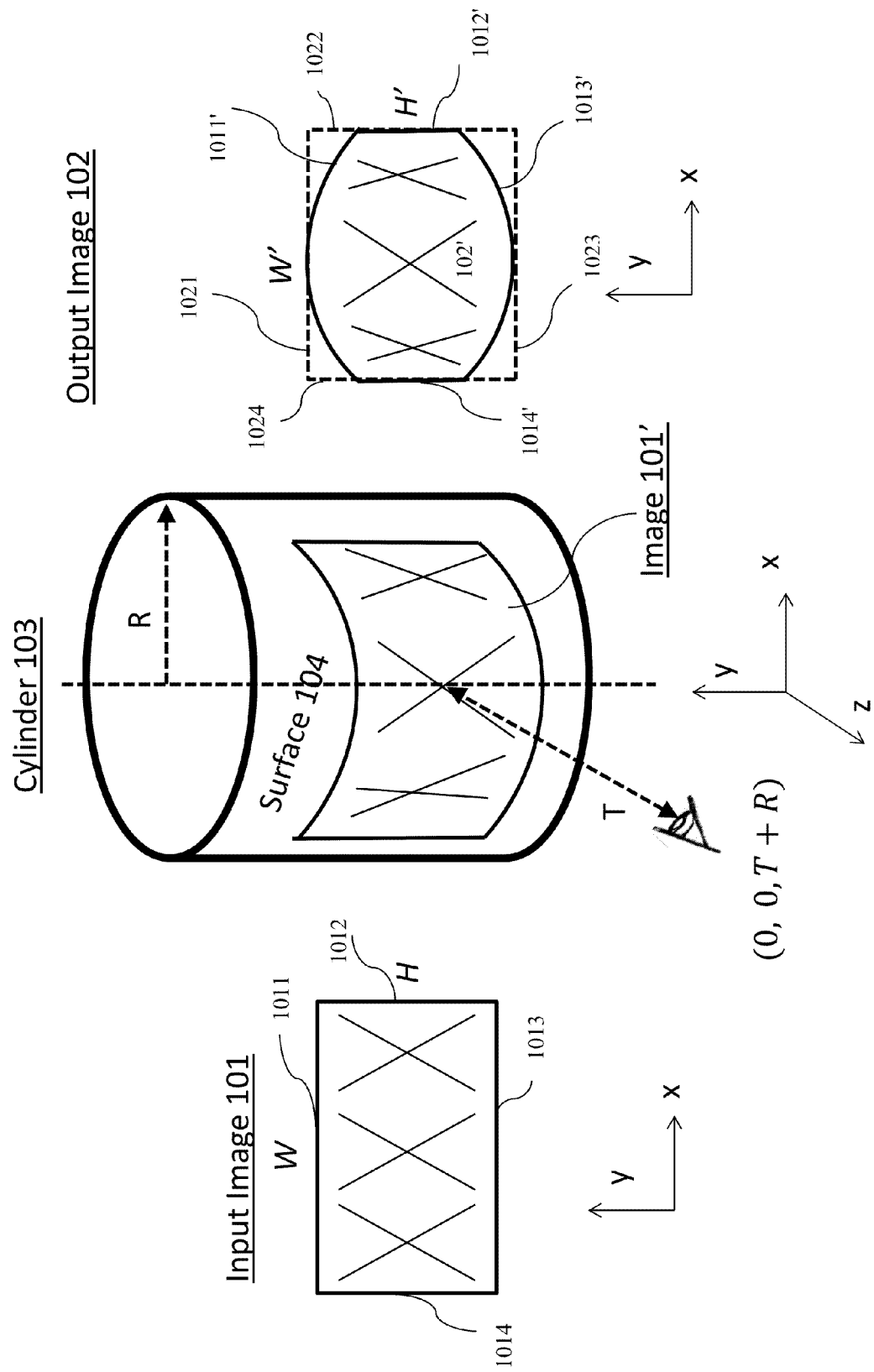
FIG. 1 illustrates a process of resizing an image by transforming the image from the 2D space to the 3D space, in accordance with one embodiment of the present invention.

FIG. 1 illustrates a process of resizing an input image (101) in accordance with one embodiment of the present invention. The input image (101) has a rectangular shape and has four edges (1011, 1012, 1013, and 1014). The width and height of the input image (101) are W and H, respectively. As shown, the process first transforms the input image (101) from the 2D space to the 3D space by projecting the input image (101) onto the lateral surface (104) of a cylinder (103) with a radius R, wherein the geometry center of the 3D cylinder (103) is located at the origin of the 3D coordinate system. After the transformation, a 3D image (101') is generated. Then, the process applies perspective projection to further transform the image (101') into a temporary output image (102'). As shown, the viewpoint of the perspective projection is set at (0, 0, T+R), wherein T represents the distance between the viewpoint and the surface (104) on z-axis. Details of these transformations are discussed in connection with FIG. 3 below. Due to these transformations, the shape of the temporary output image (102') will be different from the shape of the input image (101). For example, as shown in FIG. 1, the four edges (1011', 1012', 1013', and 1014') of the temporary output image (102') do not define a rectangular shape anymore. Based on the shape and dimensions of the temporary output image (102'), four new edges (1021, 1022, 1023, and 1024) forming a rectangular shape are calculated to define the final output image (102), which fully contains the temporary output image (102'). In one embodiment, the gaps, areas between the new edges (1021, 1022, 1023, and 1024) and the edges (1011', 1012', 1013', and 1014') of the temporary output image (102'), can be filled with a solid background color (e.g., black, blue, white) depending on the color and/or texture of the temporary output image (102'). For example, the color(s) of the temporary output image (102') at or near each of the edges (1011', 1012', 1013', and 1014') can be extended into the four different areas, respectively, (i.e., color extension).

That way, the newly filled gaps would mingle with the temporary output image (102') more naturally. Alternatively, the gaps, particularly the ones located below the temporary image (102'), can be filled with reflections of the temporary image (102').

In another embodiment of the present invention, instead of projecting the input image (101) onto the lateral surface of the cylinder (103), the image resizing process projects the input image (101) onto the lateral surface of a cone, the surface of a sphere, or a surface of any geometric shape to generate the temporary output image (101'). Depending on an image's theme or content (e.g., scenery, portrait, and logo), the image resizing process selects a geometric shape that can achieve the best result.

Figure 2:
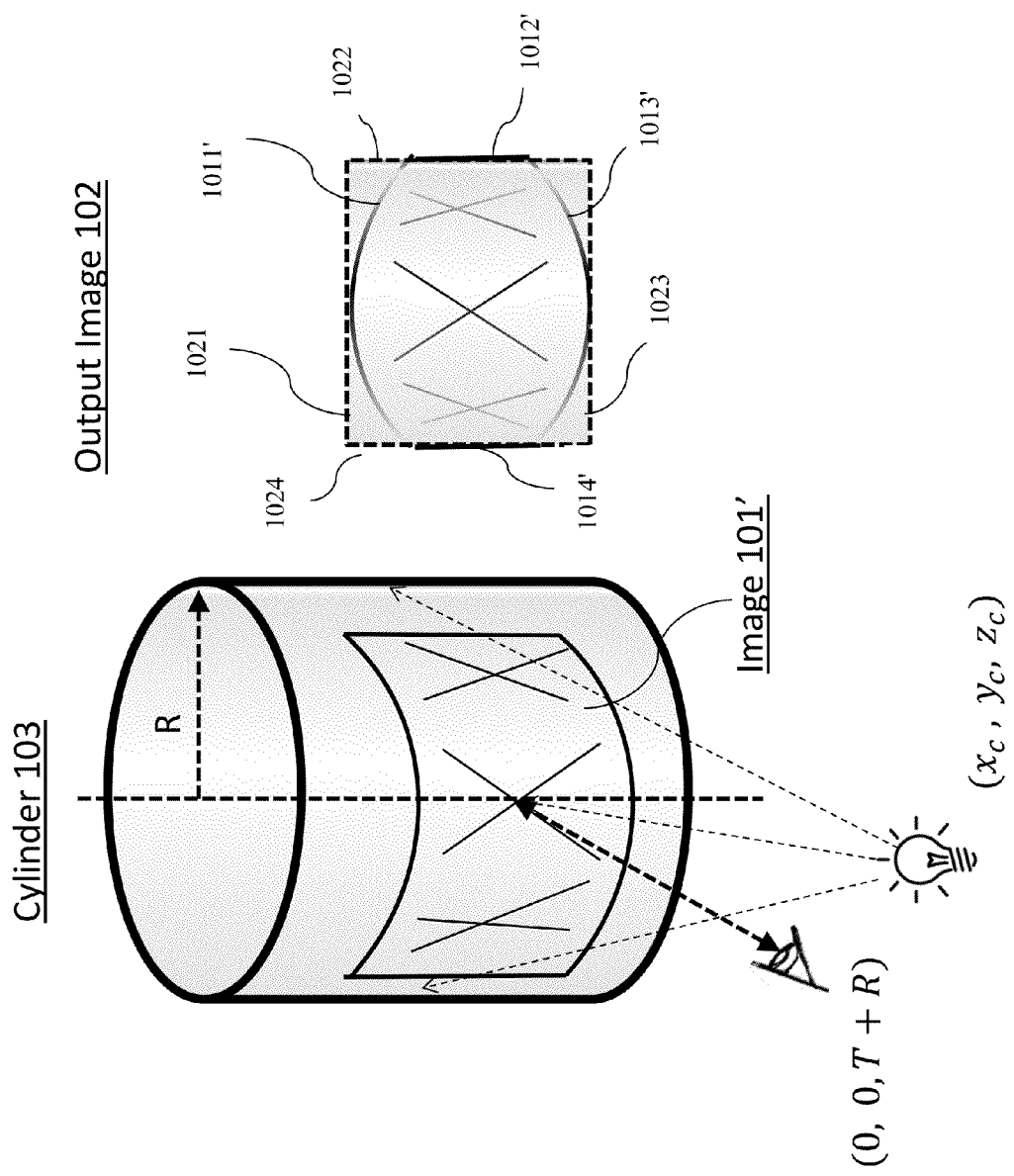
FIG. 2 illustrates applying shading (or other light effects) to the transformed image described in FIG. 1.

FIG. 2 illustrates applying shading (or other light effects) to the transformed image described in FIG. 1 to enhance the image's 3D effect. In this embodiment, just one light source is used for this purpose. Further details of the shading process are discussed in the context of FIG. 3. Alternatively, more than one light source could be chosen for this purpose.

Figure 3:
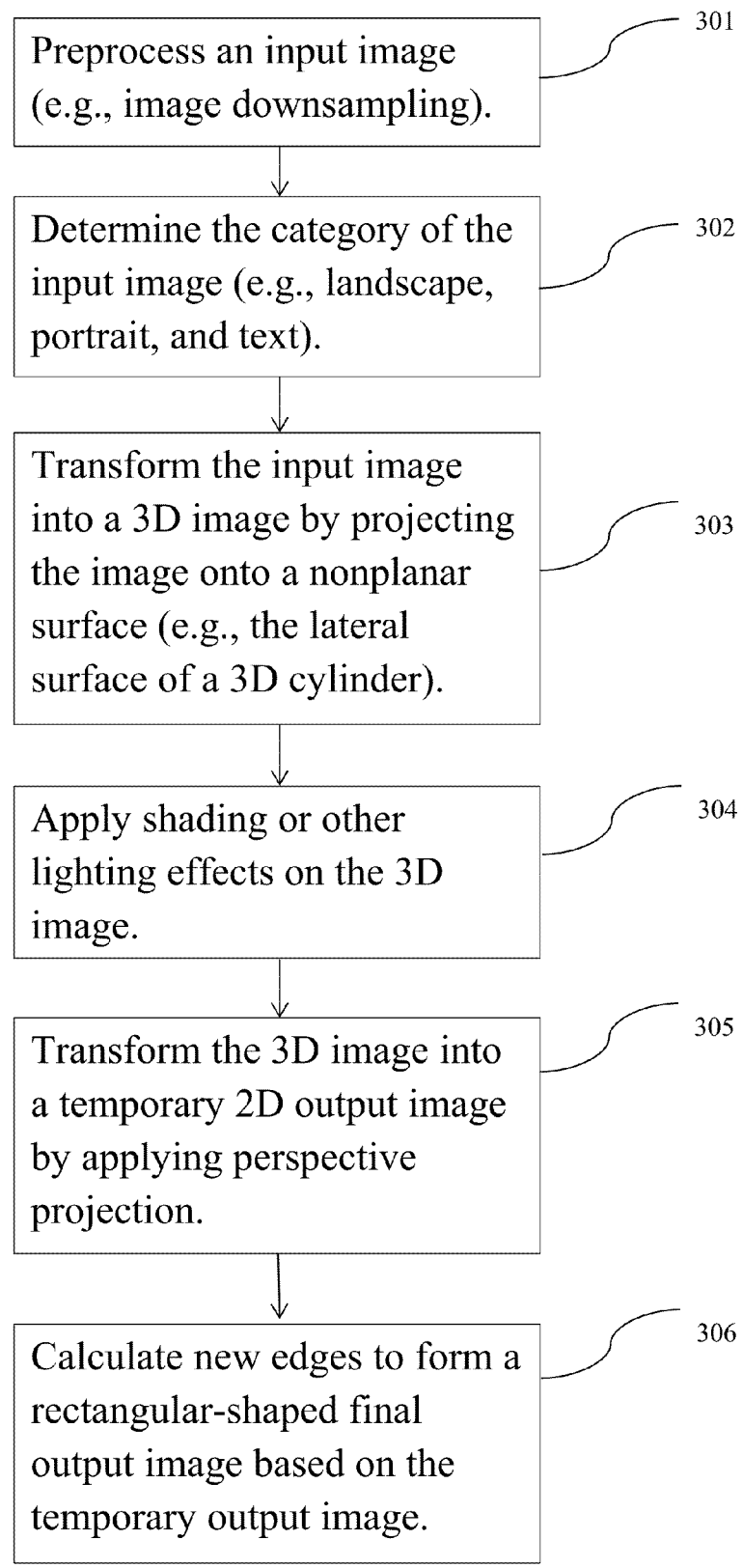
FIG. 3 is a flow diagram illustrating the resizing process described in FIG. 1, in accordance with one embodiment of the present invention.

FIG. 3 is a flow diagram illustrating the resizing process described in FIGS. 1 and 2. At step 301, the resizing process receives an input image (101) and preprocesses the image by optional steps such as downsampling, etc. Image downsampling serves the purpose of reducing the size of the data. In one embodiment, if the data size of the input image exceeds a predetermined threshold, the downsampling preprocess is applied to reduce the input image's data size. For example, if the image resizing process is running on a less powerful computing platform, e.g., a mobile phone or a tablet computer, the threshold can be set relatively lower than if the resizing process is running on a much powerful computing platform, e.g., a desktop computer or a server. Alternatively, the threshold can be dynamically set based on a list of real-time factors or conditions on the computing platform such as how much main memory is currently available, how busy the processor currently is, how fast the network speed is, etc. There are various downsampling algorithms, including but not limited to pixel skipping, linear averaging, and median filter. Pixel skipping has low computational cost but may cause alias. Linear averaging typically achieves better visual quality with mild computation cost. Median filter is slow but can reduce noise and has sharper edges. Depending on the content type of the input image, a specific downsampling algorithm can be selected. For example, linear averaging is recommended for portrait and scenery, which typically have less edge information and smooth visual quality is desired. Median filter is recommended for downsampling text or logo image where sharp edges are important.

At step 302, the resizing process determines to which category (e.g., scenery, portrait, and text) the input image (101) belongs. Various algorithms are available for this purpose. For example, a number of face detection algorithms are discussed in Ming-Hsuan Yang, David J. Kriegman, and Narendra Ahuja, *Detecting Faces in Images: A Survey*, IEEE TRANSACTIONS ON PATTERN ANALYSIS AND MACHINE INTELLEGENCE, VOL. 20, NO. 1 (January 2002). Optical character recognition (OCR) algorithms have been widely used for detecting and recognizing text information from images. Furthermore, with the help of text detection methods, this image resizing invention can be optimized. For example, in case where the text of an input image runs vertical direction, such as Chinese poetry, the 3D cylinder (103) can switch its direction from vertical to horizontal (i.e., turning 90 degrees around the z-axis).

At step 303, the resizing process projects the input image (101) onto the lateral surface of the cylinder (103) to transform the input image (101) into a 3D image (101'). For each pixel with color p and coordinate (x, y) of the input image (101), the transformed 3D coordinate is $$X_s = \left(R * \sin\left(\frac{x}{R}\right), y, R * \cos\left(\frac{x}{R}\right)\right),$$

where R is the radius of the cylinder (103).

At step 304, the resizing process applies shading effect on the 3D image (101'). Assuming the light source's coordinate is $x_c = (x_c, y_c, z_c)$, the adjusted pixel color can be formulated as p'=p*θ, where θ is the cosine angle defined as $$\theta = \frac{\langle X_s - X_c, X_s \rangle}{\|X_s - X_c\|_2 * \|X_s\|_2}.$$

At step 305, the resizing process transforms the 3D image (101') into the temporary output image (102') via perspective projection at a viewpoint (0, 0, T+R). After such transformation, the 3D coordinate $(x_s, y_s, z_s)$ changes into 2D coordinate (x', y'), where $$x' = R * \frac{\sin\left(\frac{x}{R}\right)}{R * \left(1 - \cos\left(\frac{x}{R}\right)\right) + T} \text{ and } y' = \frac{y}{R * \left(1 - \cos\left(\frac{x}{R}\right)\right) + T}$$

Note that the scale factor, which does not affect the aspect ratio of the temporary image (102'), is omitted in the above equations. Thus, for each pixel with color p and coordinate (x, y) of the input image (101), the resizing process transforms it into color p' and coordinate (x', y').

As discussed above, due to these transformations, the shape of the temporary output image (102') will deviate from the shape of the input image (101) accordingly. For example, as shown in FIG. 1, the four edges (1011', 1012', 1013', and 1014') of the temporary output image (102') do not define a rectangular shape anymore. As shown, because the 3D cylinder (103) is positioned vertically, edges 1012' and 1014' are straight and parallel to the y-axis and edges 1011' and 1013' are curved. At step 306, based on the shape and dimensions of the temporary output image (102'), the resizing process calculates four new edges (1021, 1022, 1023, and 1024) to form a rectangular shaped final output image (102). In the current exemplary embodiment, new edges (1022 and 1024) incorporate and extend edges (1012' and 1014'), respectively. New edge (1021) is parallel to the x-axis and is tangent to edge (1011'). Similarly, new edge (1023) is parallel to the x-axis and is tangent to edge (1013'). The final output image (102) incorporates all of the pixels of the temporary output image (102'). For those areas of the final output image (102) that are not filled by pixels of the temporary output image (102'), the resizing process can fill them with a solid background color (e.g., black, blue, etc.) depending on the color of the temporary output image (102'). Alternatively, the areas, particularly the ones located below the temporary image (102'), can be filled with reflections of the temporary image (102'). Given a pixel in those areas, its mirrored pixel (i.e., reflection) on the opposite side of the curved edge (1013') can be computed with orthogonal geometry, and the pixel color can be defined based on mathematical models (e.g., ray tracing in computer graphics).

As shown in FIG. 1, assuming the input image (101)'s width and height are W and H, respectively, the final output image (102)'s width W' and height H' can be represented as follows:

$$W' = D * \frac{\sin\left(\frac{W}{D}\right)}{R*\left(1-\cos\left(\frac{W}{D}\right)\right)+T},$$

(subject to $W < 0.5*\pi*D$) and $H' = \frac{H}{T}$, where $D = 2R$

Therefore, the final output image (102)'s aspect ratio is $$A' = \frac{W'}{H'} = D * \frac{T*\sin\left(\frac{W}{D}\right)}{H*\left(0.5*D*\left(1-\cos\left(\frac{W}{D}\right)\right)+T\right)},$$

(subject to $W < 0.5*\pi*D$).

By adjusting the 3D cylinder (103)'s diameter D and the distance T, the aspect ratio of an image $$\left(A = \frac{W}{H}\right)$$

can be adjusted to fit into a specified display space. For example, if D increases and T remains the same, then W' increases (up to W) while H' remains the same. As a result, the aspect ratio A' increases. As expected, when D approaches infinite, A' will approach A:

$$\lim_{D\to\infty} A' = \lim_{D\to\infty} D * \frac{T*\sin\left(\frac{W}{D}\right)}{H*\left(0.5*D*\left(1-\cos\left(\frac{W}{D}\right)\right)+T\right)} = A.$$

In addition, from the above equations, the resizing ratio can be represented as:

$$\frac{A'}{A} = D * \frac{T*\sin\left(\frac{W}{D}\right)}{W*\left(0.5*D*\left(1-\cos\left(\frac{W}{D}\right)\right)+T\right)}.$$

Let $D=m*W$ and $T=n*W$, the resizing ratio equation can be rewritten as follows:

$$\frac{A'}{A} = D * \frac{T*\sin\left(\frac{W}{D}\right)}{W*\left(0.5*D*\left(1-\cos\left(\frac{W}{D}\right)\right)+T\right)}$$

$$= m * \frac{n*\sin\left(\frac{1}{m}\right)}{\left(0.5*m*\left(1-\cos\left(\frac{1}{m}\right)\right)+n\right)}.$$

Figure 4:
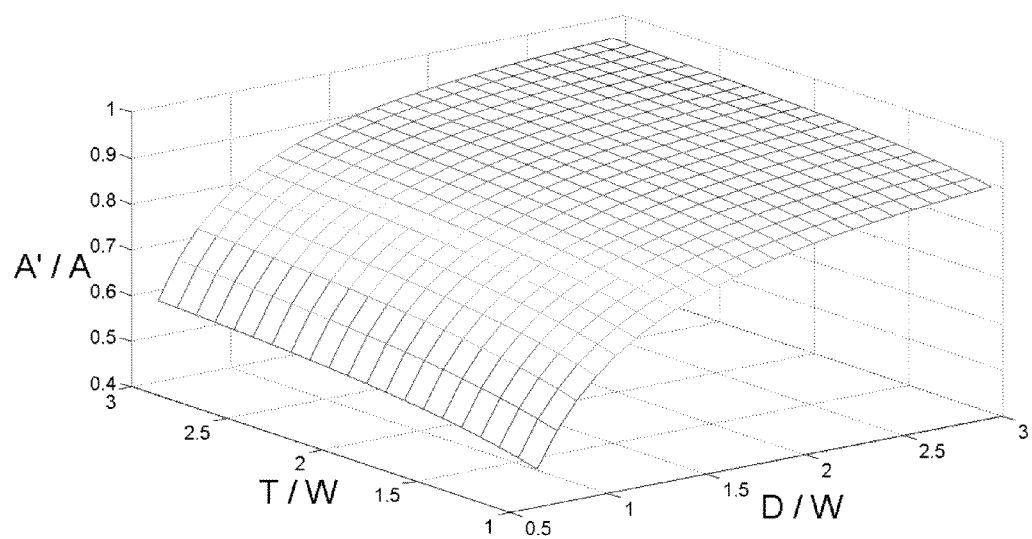
FIG. 4 illustrates how the resizing result can be affected by the selection of the 3D cylinder's diameter and the viewpoint for the perspective projection.

FIG. 4 shows that both the 3D cylinder (103)'s diameter D and the viewpoint distance T can be used to resize the input image (101). It also shows that D has more significant impact than T. If the final output image's shape is a square, then A'=1. That is, $$A' = 1 = D * \frac{T*\sin\left(\frac{W}{D}\right)}{H*\left(0.5*D*\left(1-\cos\left(\frac{W}{D}\right)\right)+T\right)}$$

or, equivalently, in the closed-form format $$T = \frac{0.5*D*H*\left(1-\cos\left(\frac{W}{D}\right)\right)}{D*\sin\left(\frac{W}{D}\right)-H},$$

(subject to $W<0.5*\pi*D$). If W and H are known, then there will be multiple solutions for D and T. The larger the value of T is, the further the viewpoint is from the lateral surface (104) of the cylinder (103), and the smaller the final output image (102) would become. The larger the value of D is, the flatter the lateral surface (104) is, and the less the deformation of the final output image (102) is.

In one embodiment, the resizing process could choose the solution that has the largest D so that the final output image (102) is least deformed. For example, by using the Lagrangian relaxation and/or constrained optimization methods, one could solve the constrained optimization problem below and find the optimal $\hat{T}$ that achieves the square-shaped output image:

$$\hat{T} = \underset{T}{\mathrm{argmax}}\left\{D \mid 1 = \frac{T*\sin\left(\frac{W}{D}\right)}{H*\left(0.5*D*\left(1-\cos\left(\frac{W}{D}\right)\right)+T\right)}\right\}$$

$$= \underset{T}{\mathrm{argmax}}\left\{D + \lambda\left(1 - \frac{T*\sin\left(\frac{W}{D}\right)}{H*\left(0.5*D*\left(1-\cos\left(\frac{W}{D}\right)\right)+T\right)}\right)\right\},$$

with constraints $W<0.5*\pi*T*D$ and $T>0$, where $\lambda$ is a Lagrange multiplier. The maximal value $\hat{D}$ can be derived during the optimization process.

In another embodiment, the resizing process could choose the solution that has the smallest T so that the final output image has least scaling. By using constraint optimization methods, one could solve the constrained optimization equation below and find the optimal diameter $\hat{D}$ that achieves the square shaped output image:

$$\hat{D} = \underset{D}{\mathrm{argmin}}\left\{T = \frac{0.5*D*H*\left(1-\cos\left(\frac{W}{D}\right)\right)}{D*\sin\left(\frac{W}{D}\right)-H}\right\}$$

$$= \underset{D}{\mathrm{argmin}}\left\{\frac{0.5*D*H*\left(1-\cos\left(\frac{W}{D}\right)\right)}{D*\sin\left(\frac{W}{D}\right)-H}\right\}$$

with constraints:

$$W < 0.5*\pi*D \text{ and } D*\sin\left(\frac{W}{D}\right) > H.$$

The minimized value of above equation is $\hat{T}$. Alternatively, substituting $\hat{D}$ into the closed-form solution of $$T = \frac{0.5 * D * H * \left(1 - \cos\left(\frac{W}{D}\right)\right)}{D * \sin\left(\frac{W}{D}\right) - H}$$

yields the optimal $$\hat{T} = \frac{0.5 * \hat{D} * H * \left(1 - \cos\left(\frac{W}{\hat{D}}\right)\right)}{\hat{D} * \sin\left(\frac{W}{\hat{D}}\right) - H}.$$

Without loss of generality, given any expected image aspect ratio A', above embodiments can be used to find $\hat{D}$ while minimizing T or find $\hat{T}$ while maximizing D.

Alternatively, if T>>D (i.e., the view point is far from the cylinder relative to the cylinder's diameter), $$\tilde{A}' = D * \frac{\sin\left(\frac{W}{D}\right)}{W} = D * \frac{\sin\left(\frac{W}{D}\right)}{W} * \frac{W}{H} = D * \frac{\sin\left(\frac{W}{D}\right)}{W} * A.$$

Given the input image (101)'s width W and height H and the expected aspect ratio A', D can be computed numerically, for example, by Newton-Raphson method based on the equation below:

$$\tilde{A}' * H = D * \sin\left(\frac{W}{D}\right),$$

subject to $W < 0.5 * \pi * D$

In particular, if $\tilde{A}'=1$ (that is, the input image is to be resized into a square shape), then $$\frac{H}{D} = \sin\left(\frac{W}{D}\right) \text{ or } H = D * \sin\left(\frac{W}{D}\right),$$

subject to $W<0.5*\pi*D$. With numerical analysis methods, such as Newton-Raphson method, D can be found with given W and H.

In addition, the equation $$\tilde{A}' = D * \frac{\sin\left(\frac{W}{D}\right)}{W} * A$$

can be rewritten as $$\frac{\tilde{A}'}{A} = D * \frac{\sin\left(\frac{W}{D}\right)}{W} = \frac{\sin\left(\frac{W}{D}\right)}{\frac{W}{D}} = \text{sinc}\left(\frac{W}{D}\right),$$

subject to $W<0.5*\pi*D$, where sin c( ) is the Fourier transform of the box function. This result can be explained in that the 3D cylinder (103)'s surface (104) is equivalent to a sine wave transformer. It transforms the original input image from a 2D rectangular shape into the 3D space like Fourier transform in signal processing. The transforming property can be extended to the cone-shaped lateral surface whose diameter D changes in a linear fashion along the y-axis. It can also be extended to nonlinear surfaces. The equation $$\frac{\tilde{A}'}{A} = \text{sinc}\left(\frac{W}{D}\right)$$

indicates that the degree of the shape change is subject only to the original image width and the 3D surface's diameter.

Figure 5A:
FIGS. 5A and 5B include two examples (and results) of applying the resizing process illustrated in FIGS. 1, 2 and 3 on two input images, respectively.
Figure 5A:
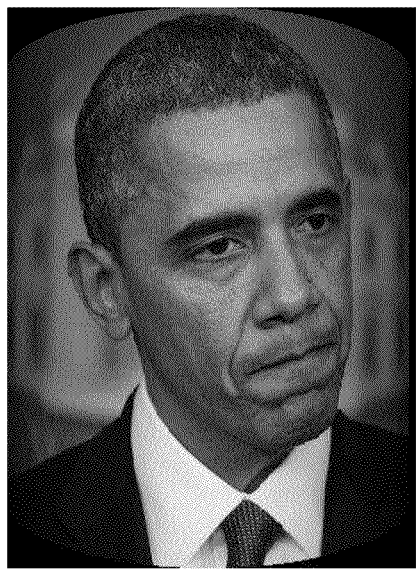

FIG. 5A shows an example of applying the resizing process described above on a portrait of president Obama. As shown, the size of the original image is 600×400 pixels. After applying the resizing process, the size of the image is changed to 291×400 pixels.

Figure 5B:
Figure 5B:

FIG. 5B shows an example of applying the resizing process described above on a scenery image. As shown, the size of the original image is 800×600 pixels. After applying the resizing process, the size of the image is changed to 593×600 pixels, a substantially square-shaped image.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method performed by a processor for resizing a digital image comprising:

transforming the digital image into a 3D image by projecting the digital image onto a lateral surface of a 3D cylinder, wherein for each pixel (x, y) of the digital image the corresponding pixel of the 3D image is (R*sin(x/R), y, R*cos(x/R)), wherein R is the radius of the 3D cylinder;

applying perspective projection to transform the 3D image into a 2D image, wherein the 2D image has a plurality of original edges; and calculating a plurality of new edges for the 2D image, wherein the plurality of new edges form a rectangular shape which fully covers the 2D image, and wherein the plurality of new edges and plurality of original edges of the 2D image form a plurality of areas.

2. The method of claim 1, further comprising applying shading effect to the 3D image before transforming the 3D image into the 2D image.

3. The method of claim 1, further comprising calculating a reflection of the 2D image and adding the reflection to one or more of the plurality of areas.

4. The method of claim 1, further comprising applying color extension to the plurality of areas.

5. The method of claim 1, wherein a first one of the plurality of new edges is an extension of a first one of the plurality of original edges, a second one of the plurality of new edges is tangent to a second one of the plurality of original edges, a third one of the plurality of new edges is an extension of a third one of the plurality of original edges, and a fourth one of the plurality of new edges is tangent to a fourth one of the plurality of original edges.

6. The method of claim 5, further comprising determining an appropriate diameter for the 3D cylinder and an appropriate viewpoint for the perspective projection so that said rectangular shape formed by the plurality of new edges has a predetermined aspect ratio.

7. The method of claim 6, wherein the predetermined aspect ratio is 1.

8. The method of claim 1, further comprising determining the digital image's content and selecting a position for said 3D cylinder for said projecting and perspective projection based on the content.

9. The method of claim 1 further comprising:
determining a maximal value D and an optimal value T based on $$\hat{T} = \underset{T}{\operatorname{argmax}}\left\{D \mid 1 = \frac{T*\sin\left(\frac{W}{D}\right)}{H*\left(0.5*D*\left(1-\cos\left(\frac{W}{D}\right)\right)+T\right)}\right\},$$

with constraints: W<0.5*π*D and T>0, wherein the digital image is a rectangular-shaped image having a width W and a height H;
setting R's value to be half of the maximal value D; and
setting a viewpoint for said perspective projection, wherein the viewpoint is at a distance of the optimal value T from said lateral surface of the 3D cylinder.

10. The method of claim 1, further comprising:
determining a minimal value T and an optimal value D based on $$\hat{D} = \underset{D}{\operatorname{argmin}}\left\{T = \frac{0.5*D*H*\left(1-\cos\left(\frac{W}{D}\right)\right)}{D*\sin\left(\frac{W}{D}\right)-H}\right\}$$

with constraints:

$$W < 0.5*\pi*D \text{ and } D*\sin\left(\frac{W}{D}\right) > H,$$

wherein the digital image is a rectangular-shaped image having a width W and a height H;
setting R's value to be half of the optimal value D; and
setting a viewpoint for said perspective projection, wherein the viewpoint is at a distance of the minimal value T from said lateral surface of the 3D cylinder.

11. A computer system for resizing a rectangular-shaped digital image having a width W and a height H, the system comprising:
a memory for storing instructions, and
a processor which, upon executing the instructions, performs a process comprising:
transforming the digital image into a 3D image, wherein for each pixel (x, y) of the digital image the corresponding pixel of the 3D image is (R*sin(x/R), y, R*cos(x/R)), and wherein R is a predetermined value; and
applying perspective projection to transform the 3D image into a 2D image.

12. The system of claim 11, wherein the process further comprises calculating a plurality of new edges for the 2D image which form a rectangular shape that fully covers the 2D image.

13. The system of claim 12, wherein the process further comprises:
determining a maximal value D and an optimal value T based on $$\hat{T} = \underset{T}{\operatorname{argmax}}\left\{D \mid 1 = \frac{T*\sin\left(\frac{W}{D}\right)}{H*\left(0.5*D*\left(1-\cos\left(\frac{W}{D}\right)\right)+T\right)}\right\},$$

with constraints: W<0.5*π*D and T>0;
setting R's value to be half of the maximal value D; and
setting a viewpoint for said perspective projection according the optimal value T.

14. The system of claim 12, wherein the process further comprises:
determining a minimal value T and an optimal value D based on $$\hat{D} = \underset{D}{\operatorname{argmin}}\left\{T = \frac{0.5*D*H*\left(1-\cos\left(\frac{W}{D}\right)\right)}{D*\sin\left(\frac{W}{D}\right)-H}\right\}$$

with constraints:

$$W < 0.5*\pi*D \text{ and } D*\sin\left(\frac{W}{D}\right) > H;$$

setting R's value to be half of the optimal value D; and
setting a viewpoint for said perspective projection according to the minimal value T.

15. A mobile device comprising:
a memory for storing instructions, and
a processor which, upon executing the instructions, performs a process comprising:
receiving a rectangular-shaped digital image having a width W and a height H;
transforming the digital image into a 3D image by projecting the digital image onto a lateral surface of a 3D cylinder, wherein for each pixel (x, y) of the digital image the corresponding pixel of the 3D image is (R*sin(x/R), y, R*cos(x/R)), and wherein R is the radius of the 3D cylinder;
applying perspective projection to transform the 3D image into a 2D image, wherein the 2D image has a plurality of original edges; and
calculating a plurality of new edges for the 2D image, wherein the plurality of new edges form a rectangular shape which fully covers the 2D image, and wherein the plurality of new edges and plurality of original edges of the 2D image form a plurality of areas.

16. The mobile device of claim 15, wherein the process further comprises applying shading effect to the 3D image before transforming the 3D image into the 2D image.

17. The mobile device of claim 15, wherein the process further comprises calculating a reflection of the 2D image and adding the reflection to one or more of the plurality of areas.

18. The mobile device of claim 15, wherein the process further comprises applying color extension to the plurality of areas.

19. The mobile device of claim 15, wherein a first one of the plurality of new edges is an extension of a first one of the plurality of original edges, a second one of the plurality of new edges is tangent to a second one of the plurality of original edges, a third one of the plurality of new edges is an extension of a third one of the plurality of original edges, and a fourth one of the plurality of new edges is tangent to a fourth one of the plurality of original edges.

20. The mobile device of claim 19, wherein the process further comprises determining an appropriate diameter for the 3D cylinder and an appropriate viewpoint for the perspective projection so that said rectangular shape formed by the plurality of new edges has a predetermined aspect ratio.

* * * * *